US007720281B2

(12) United States Patent
Lu et al.

(10) Patent No.: US 7,720,281 B2
(45) Date of Patent: May 18, 2010

(54) VISUAL CHARACTERISTICS-BASED NEWS ANCHORPERSON SEGMENT DETECTION METHOD

(75) Inventors: Ko-Yen Lu, Jhongli (TW); Min-Kuan Chang, Taichung (TW); Chia-Hung Yeh, Tai-Nan (TW); Hsuan-Huei Shih, Taipei (TW)

(73) Assignee: MAVs Lab, Inc., Lung-Tan, Tau-Yuan (TW)

( * ) Notice: Subject to any disclaimer, the term of this patent is extended or adjusted under 35 U.S.C. 154(b) by 933 days.

(21) Appl. No.: 11/495,685

(22) Filed: Jul. 31, 2006

(65) Prior Publication Data

US 2008/0050015 A1 Feb. 28, 2008

(51) Int. Cl.
G06K 9/34 (2006.01)
G06K 9/38 (2006.01)
G06K 9/00 (2006.01)
G06K 9/42 (2006.01)

(52) U.S. Cl. .................. 382/171; 382/172; 382/170; 382/174; 382/164; 382/257

(58) Field of Classification Search ................ 382/103, 382/106, 107, 118, 164–174, 224, 256–257; 715/723; 345/581
See application file for complete search history.

(56) References Cited

U.S. PATENT DOCUMENTS

| 5,859,921 | A  | * | 1/1999  | Suzuki          | 382/118    |
|-----------|----|---|---------|-----------------|------------|
| 6,292,575 | B1 | * | 9/2001  | Bortolussi et al. | 382/118  |
| 6,493,042 | B1 | * | 12/2002 | Bozdagi et al.  | 348/700    |
| 6,504,942 | B1 | * | 1/2003  | Hong et al.     | 382/103    |
| 6,549,643 | B1 | * | 4/2003  | Toklu et al.    | 382/107    |
| 6,661,907 | B2 | * | 12/2003 | Ho et al.       | 382/118    |
| 6,714,909 | B1 | * | 3/2004  | Gibbon et al.   | 704/246    |
| 6,907,136 | B1 | * | 6/2005  | Shigemori       | 382/118    |
| 7,027,054 | B1 | * | 4/2006  | Cheiky et al.   | 345/473    |
| 7,165,029 | B2 | * | 1/2007  | Nefian          | 704/236    |
| 7,167,519 | B2 | * | 1/2007  | Comaniciu et al. | 375/240.08 |
| 7,184,959 | B2 | * | 2/2007  | Gibbon et al.   | 704/270    |
| 7,305,128 | B2 | * | 12/2007 | Lee et al.      | 382/173    |
| 7,356,830 | B1 | * | 4/2008  | Dimitrova       | 725/51     |
| 7,555,149 | B2 | * | 6/2009  | Peker et al.    | 382/118    |
| 7,634,109 | B2 | * | 12/2009 | Steinberg et al. | 382/103   |
| 2002/0146168 | A1 | * | 10/2002 | Lee et al.    | 382/165    |
| 2003/0007669 | A1 | * | 1/2003  | Martinez      | 382/118    |
| 2003/0123712 | A1 | * | 7/2003  | Dimitrova et al. | 382/118 |
| 2004/0008789 | A1 | * | 1/2004  | Divakaran et al. | 375/240.26 |
| 2004/0264741 | A1 | * | 12/2004 | Omatsu et al. | 382/115    |

(Continued)

OTHER PUBLICATIONS

Feng et al. "Motion Estimation in the 3-D Gabor Domain" IEEE Transactions on Image Processing, vol. 16, No. 8. Aug. 2007, pp. 1-10.*

*Primary Examiner*—Bhavesh M Mehta
*Assistant Examiner*—Mia M Thomas
(74) *Attorney, Agent, or Firm*—Jackson IPG PLLC

(57) ABSTRACT

A method to detect anchorperson segment in news reporting by using visual characteristics to provide the basis to divide news into various categories includes steps of providing news image for skin color detection on the image with color space; applying morphology depending on whether the object in the image subject to skin color detection is moving to eliminate noise surrounding the image of the face to solve the region of the face of the anchorperson; and performing anchorperson detection once again by detecting the probable anchorperson segment.

7 Claims, 7 Drawing Sheets

U.S. PATENT DOCUMENTS

2005/0175227 A1* 8/2005 Paschalakis ................. 382/128
2005/0190965 A1* 9/2005 Hwang et al. ................ 382/165
2006/0182348 A1* 8/2006 Kinjo .......................... 382/203
2006/0288291 A1* 12/2006 Lee et al. ..................... 715/723
2009/0263040 A1* 10/2009 Rolland et al. .............. 382/255

* cited by examiner

| P1 | P2 | P3 |
|----|----|----|
| P8 | P  | P4 |
| P7 | P6 | P5 |
FIG.2
Binary image
↓
Dilation
↓
Erosion
↓
Connected Component Labeling
↓
FIG.3

FIG.4

VISUAL CHARACTERISTICS-BASED NEWS ANCHORPERSON SEGMENT DETECTION METHOD

BACKGROUND OF THE INVENTION (a) Field of the Invention

The present invention is related to a method to detect anchorperson segment in news reporting, and more particularly, to one detects anchorperson segment by taking advantage of visual characteristics to provide the basis to divide news into various categories.

(b) Description of the Prior Art

Using local features for identification has been so far the method most frequently used to locate a human face in an image. Local features applied in this method include eyes, nose tip, lips or cheeks, forehead, etc. Local features are compared with the picture detected in the image to confirm results of identification. Therefore, confirming the location of those local features becomes a critical step in the process of identifying a human face.

Methodology of locating the local features including eyes, nose and lips from an image of a human face can be roughly classified into two ways. One way refers to the image processing method, e.g., filtering, image morphological operation, or thresholding operation for locating the candidate positions of the probable facial features before confirming the position of the features among those candidate positions. Another way involves the use of the graph matching method, i.e., a model of human face is expressed by correlation graph of features. Wherein, locations of those features are defined as nodes and the relative locations among features are expressed in edges between two nodes. The image processing method is applied to solve a feature value associate to each node; and in turn, the travel of the model in the image is borrowed to locate the positions of the human face features through the graph comparison method.

In the image processing method such as that taught in U.S. Pat. No. 5,805,475 first a threshold must be defined by solving a preferred value using the statistical method based on experimental value or accumulated experimental value whereas the threshold is usually the key to identification results. As disclosed in U.S. Pat. No. 5,805,475, both of the image morphological operation and the thresholding operation involve determination of multiple thresholds. This approach for solving the threshold by adopting the heuristic method to solve the threshold must be always modified depending on the performance of the image observed. That significantly makes the difficulty in the applying the heuristic method, thus to fail a fast and effective identification of the human features in the image.

In the image comparison method such that as taught in U.S. Pat. No. 5,222,939, each node is given a set of feature values. These values must be solved in the image pending detection in order to compare with a graph model; and comparatively intensive point locations must be retrieved even through it is not necessarily to solve each pixel. U.S. Pat. No. 5,222,939 is characterized in direct search on 2D space of the image and comparatively complicated values of features for the description of the reference human face image (e.g., 2D spectrum must be solved). Therefore, whenever a human face features of the image pending detection is compared, a process of multiple operations and comparisons must be done to identify the features of the human face in the image, meaning an enormous load to the system and thus failure in improving the use efficiency. Therefore the methods to locate face features in an image of the prior art do exist many defectives that warrant further improvement.

SUMMARY OF THE INVENTION

The primary purpose of the present invention is to provide a method to detect anchorperson segment in news reporting by using visual characteristics to provide the basis to divide news into various categories. To achieve the purpose, the present invention includes multiple steps. Firstly, a news image is provided to run skin color detection on the original image with color space (YUV, NCC, HSL); followed by the application of the opening operation (including Dilation and Erosion) in morphology to eliminate noise surrounding the image of the face depending on whether the object in the image subject to skin color detection is moving; then the component connected labeling method is used to identify connected images of the same object in the image to gather information of the area, height and width of the object to further solve the region of the face of the anchorperson; and finally performing anchorperson detection once again by detecting the probable anchorperson segment to correctly find out the anchorperson segment.

BRIEF DESCRIPTION OF THE DRAWINGS

FIG. 2 is a schematic view of the present invention showing that a location pixel P in a matrix arrangement.

FIG. 3 is a schematic view of the present invention showing a process flow of labeling an image object.

FIG. 4 is a schematic view of the present invention showing a component connected labeling method.

DETAILED DESCRIPTION OF THE PREFERRED EMBODIMENTS

Figure 1:
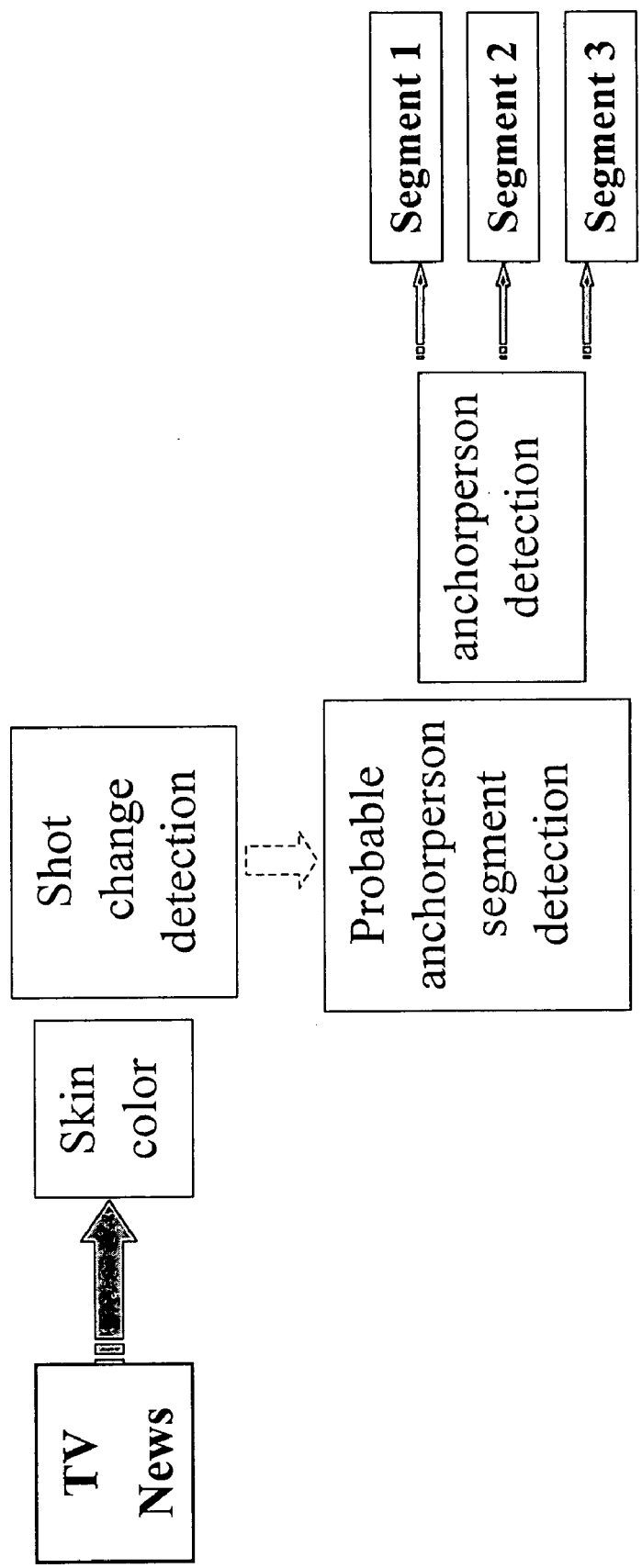
FIG. 1 is a process flow chart showing a general configuration of the present invention.

Referring to FIG. 1 for a process flow chart, a method to detect anchorperson segment in news reporting by using visual characteristics of the present invention is comprised of the following steps:

a. Providing image of TV news;
b. Performing skin color detection;
c. Shortchange detection based on skin color;
d. Probable anchorperson segment detection; and
e. Performing the anchorperson detection once again on the probable anchorperson segment to correctly find out the anchorperson segment to further divide news into various categories for achieving the purpose of news classification.

After the news image is provided, skin color detection is performed in Step b. Wherein, skin color must be defined in order to locate the region of skin color. There exists significant difference between skin color and the color in general environment. However, the color of the image defined in RGB space varies in extent depending on the intensity of the light source. The error will be great if the color division is directly performed in RGB space, therefore, the color space, e.g., YUV, NCC, HSL, which is less sensitive to the intensity of the light is used to describe the relation respectively between R, G, and B and each color space as follows:

1. YUV: the relation between YUV and RGB is related to linear relation and expressed in the formula of:

$$\begin{pmatrix} Y \\ U \\ V \end{pmatrix} = \begin{pmatrix} 0.299 & 0.587 & 0.114 \\ -0.147 & -.0289 & 0.437 \\ 0.615 & -0.515 & -0.100 \end{pmatrix} \begin{pmatrix} R \\ G \\ B \end{pmatrix}$$

And the thresholds of the skin color are:

$60 < Y < 255$ $-25 < U < 0$ $10 < V < 45$

2. NCC: the relation between NCC and RGB is expressed in the formula of:

$r = R/(R+G+B)$ $g = G/(R+G+B)$

And the thresholds of the skin color are:

Upper bound: $(-1.376) \times (r \times r) + 1.0743 \times r + 0.1452$

Lower bound: $(-0.766) \times (r \times r) + 0.5601 \times r + 0.1766$ $w = (r-0.33) \times (r-0.33) + (g-0.33) \times (g-0.33)$ 3. HSL: the relation between HSL and RGB is expressed in the formula of:

$\frac{1}{2}[(R-G)+(R-B)]$

And the thresholds of the skin color are:

$0 \leq H \leq 51$ $0.028 \leq S \leq 0.724$ $100 \leq L \leq 226$

In Step c: shortchange detection based on skin color includes stable skin color segment detection and component connected labeling to label each individual object in the image thus to avail the region of the human face of the anchorperson. The skin color analysis within the region of human face of the anchorperson the anchorperson creates a skin color threshold. Multiple images are retrieved at a fixed time lapse. The skin color of each image is then compared with the skin color threshold, and shortchange of the anchorperson is judged if the skin color value of the image is greater than the threshold.

Wherein, the stable skin color segment detection done by applying the opening operation method in morphology includes dilation and erosion. Dilation involves expansion of region for the image and erosion involves reduction of the region for the image. A closing operation may be selected to perform dilation first and the erosion follows or erosion is done first before dilation is in an opening operation.

After the procedure described above is completed, the noise surrounding the image of the human face is eliminated and mask is applied wither in dilation or erosion operation (the size of the mask, and a N×N matrix used in the system relates to the same 3×3). Mask operation is done on the binary image after the skin color analysis and the results of the operation are labeled on a newly generated image.

In dilation operation, it is judge that if the value of a pixel P where the dilation is located in the newly generated image is 1. If yes, it is further judged whether any of eight points surrounding the pixel P is of a value of 1. If yes, P=1; if not, P is 0 as illustrated in FIG. 2, i.e.,

P=P1∩P2∩P3∩P4∩P5∩P6∩P7∩P8∩

∩=AND operation

Similarly, in erosion operation, it is judge that if the value of a pixel P where the erosion is located in the newly generated image is 1. If yes, it is further judged whether any of eight points surrounding the pixel P is of a value of 1. If yes, P=1; if not, P=0, i.e.,

P=P1∪P2∪P3∪P4∪P5∪P6∪P7∪P8∪

∪=OR operation

Upon completing the opening operation as described above, the component connect labeling method is used to locate connected images of the same object in the image as illustrated in FIG. 3 to get the information of area, height and width of the object for labeling each independent object in the image.

Figure 4:
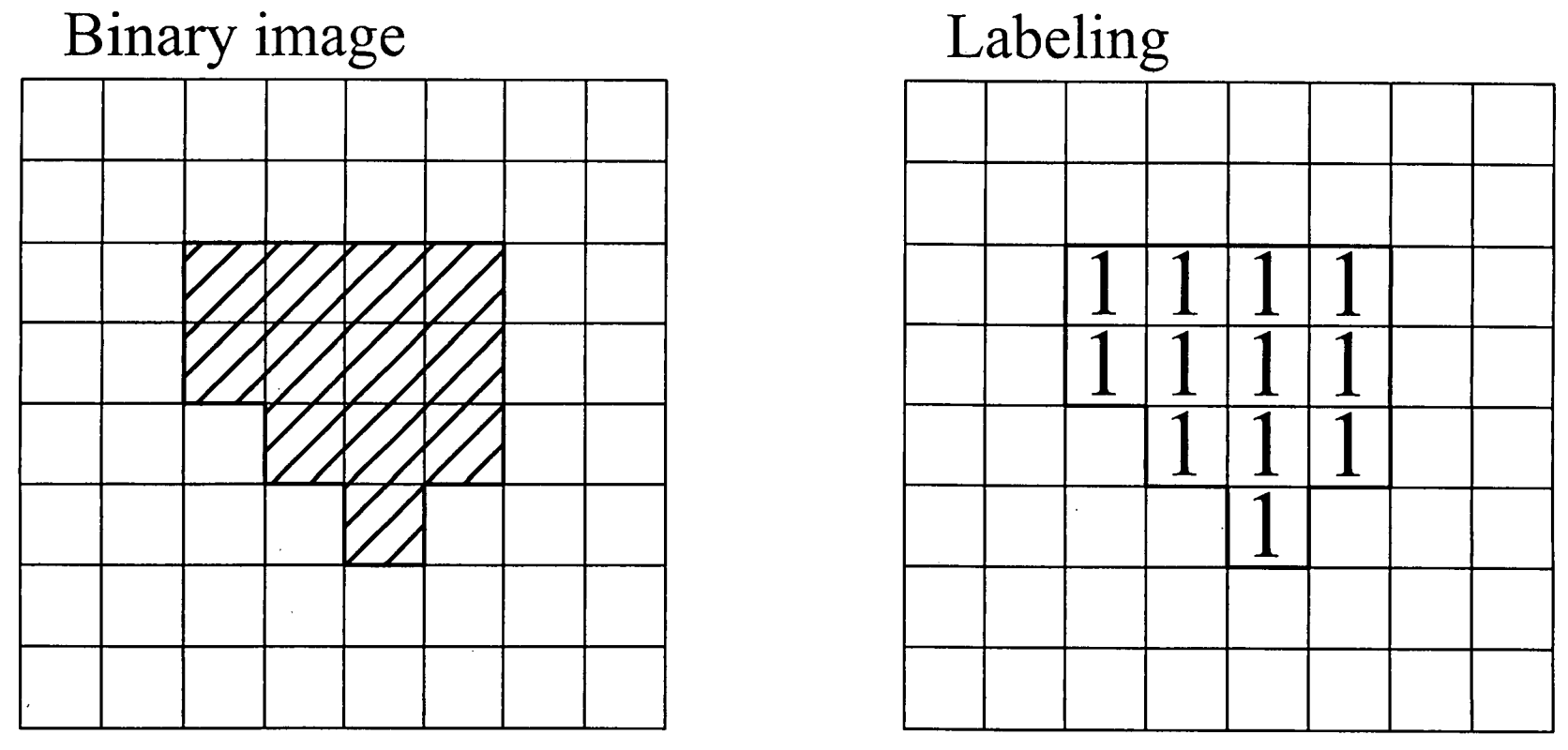

To label the object, start scanning binary image to be labeled starts from any corner on the top. Once a pixel at the value of 1 is scanned, check its four orientations in sequence of upper, lower, left, and right to see if same value of 1 exists. If yes, record its coordinate and set its value at 1. After than, check in recursive order to found if there is any pixel at the value of 1 above, below, left, and right to the pixel just recorded. If yes, record the coordinate of the point newly identified, and assign it a value of 1 as illustrated in FIG. 4. Continue to check of the entire recursion until there is no further pixel with a value of 1 to appear in either of four orientations of each of all the pixels recorded. Upon terminating the operation of recursive inspection is done, objects of the first group can be located. The rest may be deducted by analogy, and upon the scan recursion for the entire image is completed, information including area, height, and width of all the objects in the image can be summarized.

Figure 5:
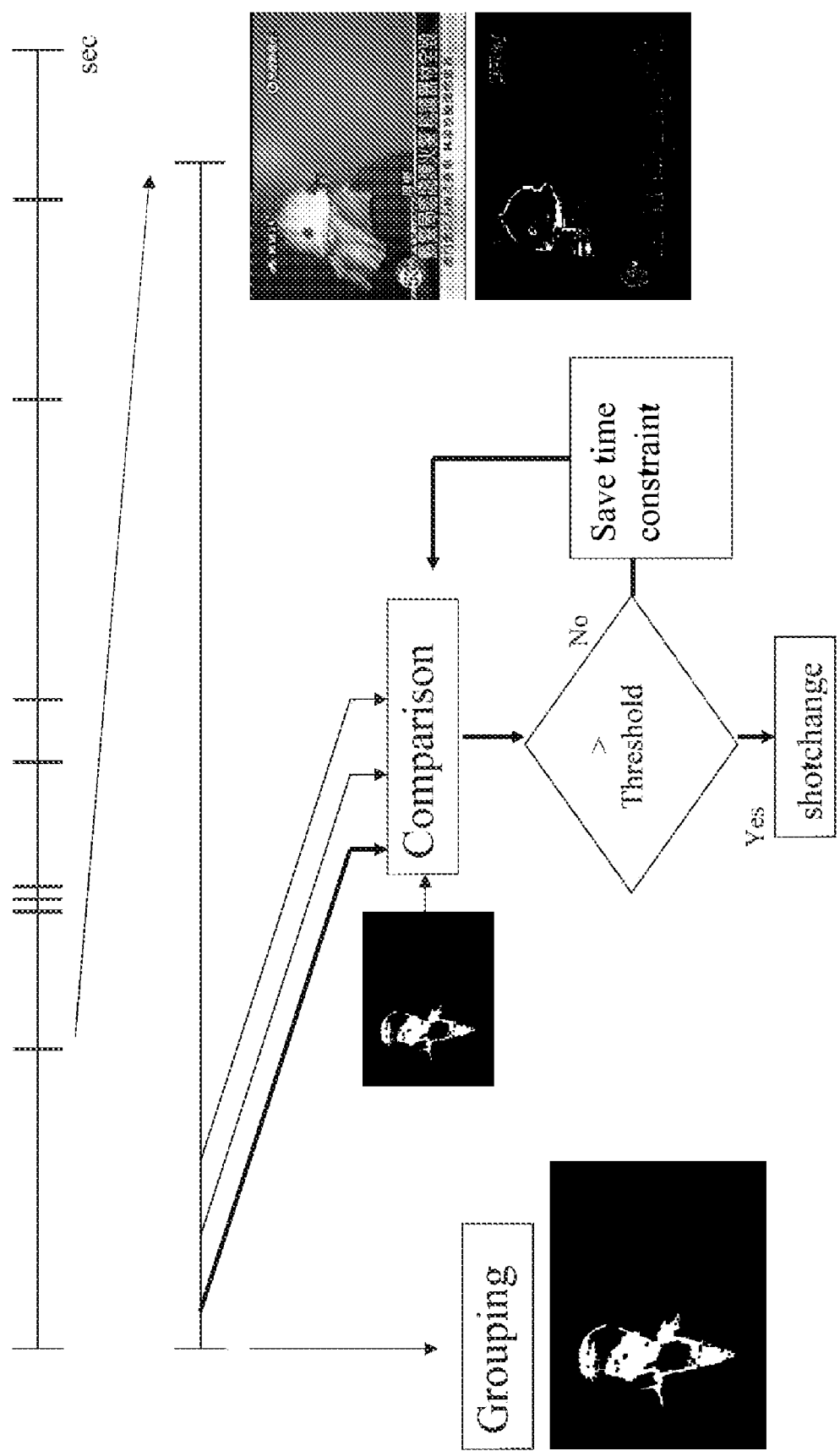
FIG. 5 is a schematic view of the present invention showing a process flow of detecting whether an anchorperson is moving.

Accordingly, color space (YUV, NCC, and HSL) is used to execute skin color detection on the original image and the results of the detection of skin color are converted into a binary image, followed by using the opening operation including dilation and erosion in morphology to eliminate noise surrounding the image of the human face, and by operating the component connected labeling method to locate connected images of the same object in the image for gathering information of area, height, and width of the object to define the region of the face of the anchorperson. Analysis of the skin color within the region of the face of the anchorperson define a threshold of skin color as illustrated in FIG. 5, and multiple images are retrieved at a fixed time lapse followed by a comparison between the skin color of each image and the threshold of skin color. If the former is greater than the latter, it is judged that the anchorperson has moved.

Figure 6:
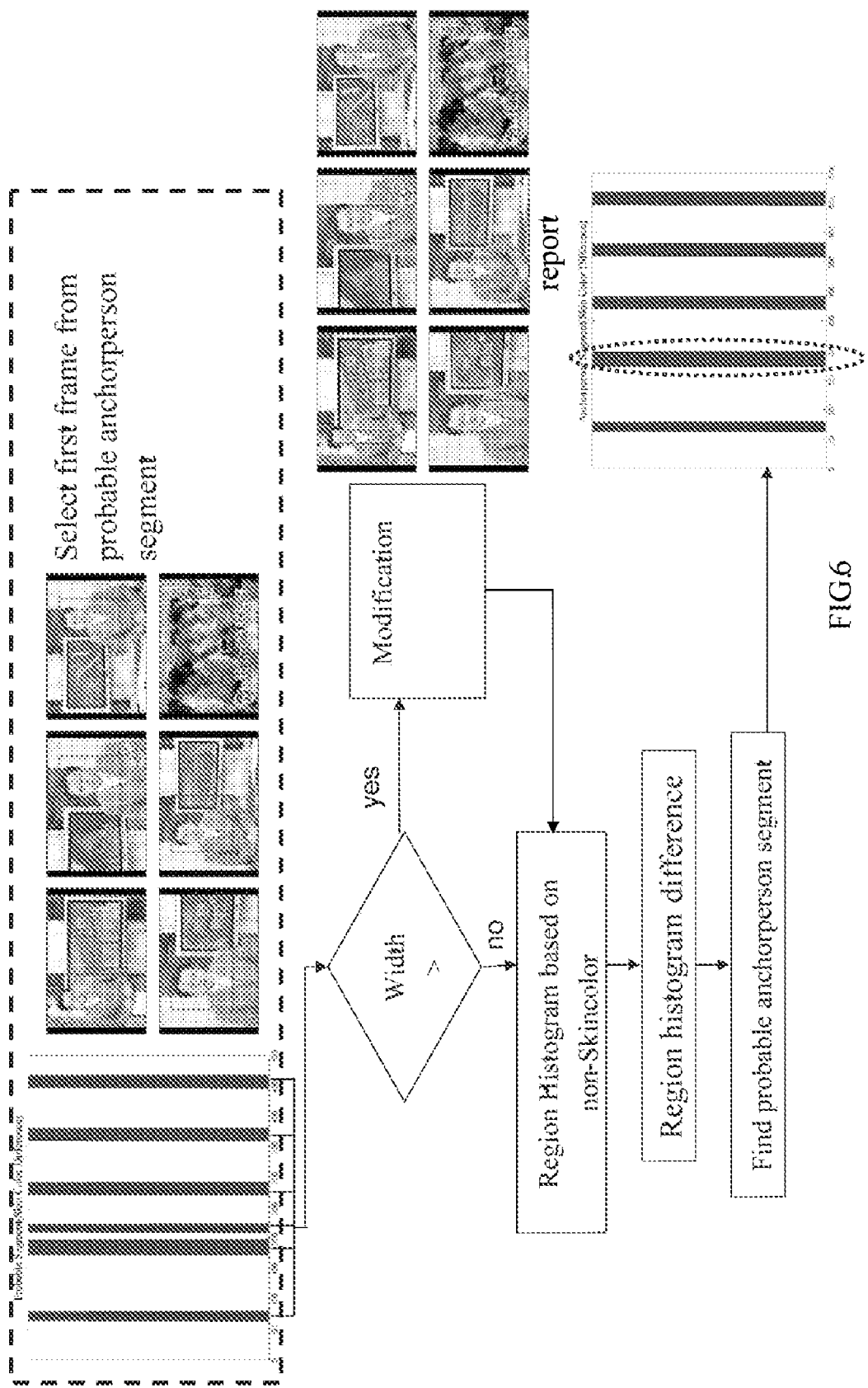
FIG. 6 is a schematic view of the present invention showing a process of detecting probable anchorperson segment.

In Step d: Probable anchorperson segment detection, the image of the anchorperson and that of non-anchorperson are distinguished. To distinguish, regions respectively of the anchorperson and the non-anchorperson are located by applying the method described above, and analysis is done on the regions respectively of skin color and non-skin color in the region of each face (usually the color of the clothes). Both regions are then plotted into histogram. If the width of the region of the human face is greater than its height (whereas usually the width of a human face is smaller than its height), modification is further used to perform the location once again to avail the correct region of human face and plot both of the skin color region and the non-skin color region into histogram as illustrated in FIG. 6.

The anchorperson probable segment can be located by comparing the difference in the non-skin color region of face between the anchorperson and the non-anchorperson (since the difference in skin color region may be insignificant, the non-skin color region is taken as the difference in the clothes of both persons for comparison).

Figure 7:
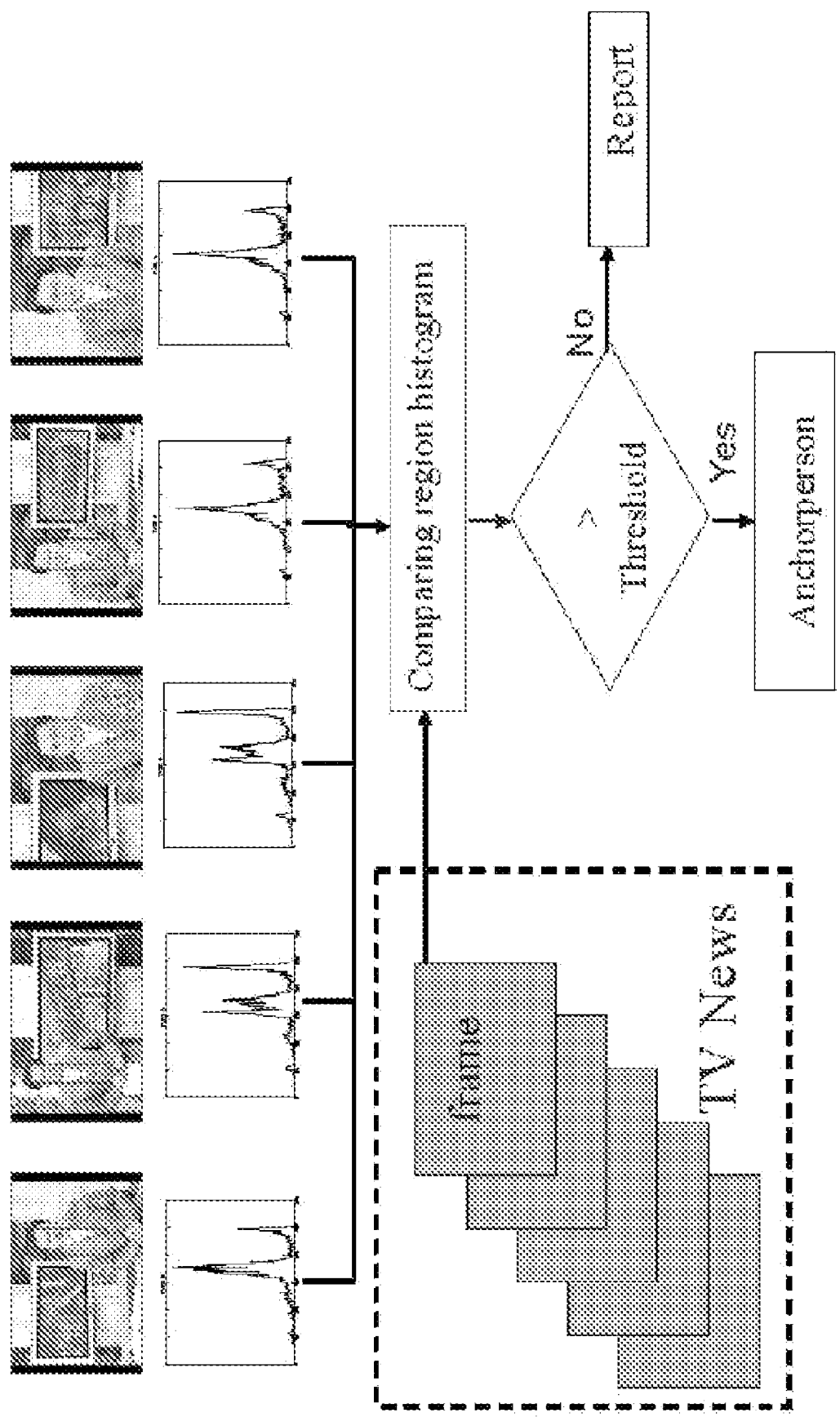
FIG. 7 is a schematic view of the present invention showing a process flow of a histogram difference based on non-skin color region.

In Step e: anchorperson detection involves histogram difference based on non-skin color region process and static object process (find feature of stable segment). Wherein, the former is the same as that described above by fetching the series images from the news picture and then the histogram is plotted from the non-skin color region availed from the human face region in each image for comparison of each histogram as illustrated in FIG. 7. If the non-skin color value is greater than the threshold, the probable anchorperson segment is judged; if not, report segment.

The static object process includes similar to logo detection and find anchorperson features from anchorperson segment. The similar to logo detection process involves the location of the object ever present in a section of a film. In a TV program or TV news, the logo of the TV station will always appear on the picture. Accordingly, we may take advantage of such feature to detect the location of the logo simply by using the series frames subtraction method. After two frames of image have been subtracted, the one in color much more identical is reserved and the location of the logo can be detected after a while in the process.

Figure 8:
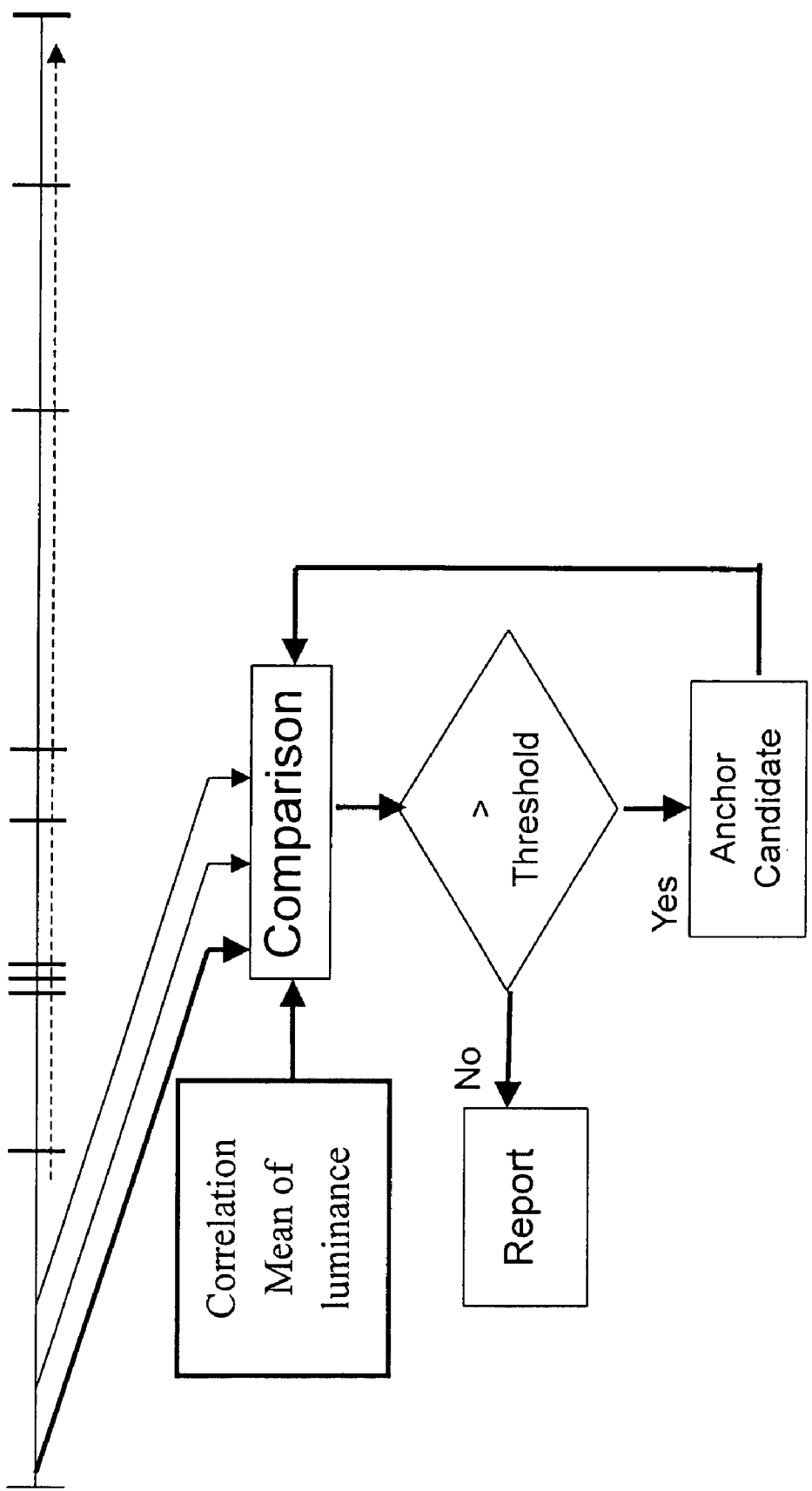
FIG. 8 is schematic view of the present invention showing a process flow of a find anchorperson features from anchorperson segment.

As for the process of finding anchorperson features from anchorperson segment involves first the retrieval of series images from anchorperson detection segment to solve by applying opportunity the mean of correlation and luminance and the standard deviation to serve the threshold as illustrated in FIG. 8. Should the correlation and luminance of the film be greater than the threshold, the probable anchorperson segment is judged; if not, the report segment.

Upon completing the steps described above, the correct anchorperson segment can be detected for proceeding division of the news into various categories to achieve the purpose of news classification.

The prevent invention provides an improved structure of a method to detect anchorperson segment in news reporting by using visual characteristics, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A method to detect an anchorperson segment in news reporting by using image data characteristics comprised of the following steps:
   a. providing image data of TV news, the data comprising a consecutive series of video frames;
   b. performing a skin color detection on the consecutive series of video frames by retrieving video frames at a fixed time lapse from the consecutive series of video frames and converting the respective retrieved video frames into binary images and identifying a skin color region from each of the binary images using a color space system, wherein the identified skin color region comprises a probable face region in each of the video frames;
   c. performing a shotchange detection based on the skin color detection by comparing the probable face regions of the retrieved video frames to a predetermined first threshold value of skin color, so that the image data of TV news is divided into first video segments which meet the predetermined first threshold value and second video segments which do not meet the predetermined first threshold value;
   d. performing a probable anchorperson segment detection on the first video segments by calculating region-histograms of the respective video frames and determining a level of non-skin color difference among the region-histograms in each of the video frames, and sorting the first video segments into probable anchorperson segments having a level of non-skin color difference substantially above a predetermined second threshold value and improbable anchorperson segments substantially having a level of non-skin color difference below the predetermined second threshold value;
   e. repeating step d, on the identified probable anchorperson segment; and
   f. determining and attaching a category identifier to the image data based on the anchorperson detection, the identifier corresponding to one or more of a plurality of news classifications.

2. The method of claim 1, wherein step b. comprises a stable skin color segment detection process that eliminates noise in the image data and a component connected labeling process of locating connected images of same objects in the binary image and gathering information of area, height and width of the objects to define the probable face region.

3. The method of claim 2, wherein the stable skin color segment detection process includes a closing operation of smoothly dilating and then eroding indentations of each of the binary images and further comprising an opening operation comprising first eroding and then dilating each of the binary images.

4. The method of claim 1, wherein step d. comprises calculation of a histogram difference based on non-skin color region and a static object process (of finding stable features in the probable anchorperson segments).

5. The method of claim 4, wherein the static object process includes a logo detection process of locating a logo object in the video frames of the image data and a process to find anchorperson features in the identified anchorperson segment.

6. The method of claim 5, wherein the logo detection process comprises locating an object ever present in the probable anchorperson segments using the series frames subtraction method of subtracting two consecutive video frames in the probable anchorperson segments and identifying positions of similar color.

7. The method of claim 5, wherein the process of finding anchorperson features present in the probable anchorperson segments comprises retrieving the series images from the probable anchorperson segments and calculating a mean of correlation and luminance and a standard deviation to serve as a third threshold for determining anchorperson segments.

* * * * *